FIP8102 OR 3,154,739

X 5308T 1 52/4D

RSD

Oct. 27, 1964 C. B. THOMAS ETAL 3,154,739

AUTOMATIC FREQUENCY CONTROL SYSTEM FOR HIGH FREQUENCY TRANSMITTERS

Filed July 9, 1962 2 Sheets-Sheet 1

SEARCH ROOM

*INVENTORS*
CLIFFORD B. THOMAS
*BY* JOHN N. OSTER

Mueller & Aichele
ATTYS.

INVENTORS
CLIFFORD B. THOMAS
JOHN N. OSTER
BY
Mueller & Aichele
ATTYS.

United States Patent Office 3,154,739
Patented Oct. 27, 1964

3,154,739
AUTOMATIC FREQUENCY CONTROL SYSTEM FOR HIGH FREQUENCY TRANSMITTERS

Clifford B. Thomas and John N. Oster, Oak Lawn, Ill., assignors to Motorola, Inc., Chicago, Ill., a corporation of Illinois Filed July 9, 1962, Ser. No. 208,208
5 Claims. (Cl. 325—184)

This invention relates to frequency control systems and more particularly to an automatic frequency control system for high frequency transmitters.

Frequency stabilization of transmitters operating in the microwave portion of the frequency spectrum presents unique problems in that a small percentage of change in the transmitted frequency results in relatively large shifts in absolute frequency. The frequency determining element of microwave transmitters, usually a distributed parameter re-entrant cavity, must be held to close dimensional tolerances to obtain a stable output frequency. It is conventional in the microwave art to stabilize the frequency of the transmitter either by changing operating voltages supplied thereto or by physically changing the cavity dimensions in response to a shift in output frequency. The latter technique provides a simple and direct method to control the transmitter frequency over a wide range and for certain types of microwave transmitters is the only practicable method.

Known automatic frequency control systems employ a microwave discriminator to supply a feedback signal for stabilizing transmitter frequency. When the transmitter is on frequency the discriminator produces the zero output and when off frequency the discriminator provides a control voltage of proper phase and magnitude to cause corrective action. However, the accuracy of conventional microwave discriminators is limited in that they require the use of two diode detectors, which diodes must be closely matched for proper operation. Subsequent aging of the diodes results in unbalance of the discriminator output and hence error in the control signal.

It is further possible to utilize a single diode and a reference cavity to provide a frequency control signal if the transmitter is frequency modulated at a predetermined rate. The frequency modulated signal is coupled to the reference cavity and detected by the diode to provide an amplitude modulated signal having a phase indicative of the direction of shift in center frequency of the transmitter. However, this technique requires that a portion of the spectrum of the frequency band of the transmitter be reserved for automatic frequency control purposes rather than for information purposes.

It is therefore an object of the present invention to provide an automatic frequency control system for a microwave transmitter which overcomes the above-mentioned limitations.

Another object is to provide a simple yet accurate system for stabilizing the frequency of a high frequency transmitter, which system is readily tunable over the entire operating range of the transmitter.

A further object is to provide an automatic frequency control system for a microwave transmitter which is independent of ageing of the signal sampling diode and which does not require frequency modulation of the transmitter output.

A feature of the present invention is the provision of means to change the resonant frequency of a reference cavity at a predetermined rate to provide a control signal indicative of frequency shifts of a transmitted signal coupled to the cavity so that the transmitted signal may be stabilized by the control signal.

Another feature is the provision of a reference cavity containing ferrite material biased by a magnetic field for determining the resonant frequency of the cavity. A unidirectional magnetic field is applied to the ferrite to establish the reference frequency and an alternating magnetic field superimposed on the unidirectional field causes the resonance of the cavity to vary around the established reference frequency to provide an amplitude modulated control signal indicative of the direction of frequency shift of a transmitted signal coupled to the cavity.

A further feature is the provision of an automatic frequency control system utilizing a ferrite loaded cavity and a single detector diode to provide an amplitude modulated signal indicative of frequency shift of a transmitter signal coupled to the cavity. An alternating magnetic field is superimposed on the linear portion of the frequency versus field strength curve established by a fixed magnetic field which loads the cavity to provide a linear and distortion free frequency variation of the cavity resonance at the same rate as the applied alternating magnetic field, and a detector diode coupled to the cavity provides an amplitude modulated signal indicative of transmitter frequency shift.

Still another feature is the provision of a ferrite loaded cavity of the above type biased by a fixed magnetic field in a manner such that the applied alternating magnetic field does not shift the resonant frequency of the cavity so that the cavity may be utilized to tune the transmitter to resonance in the absence of an applied alternating magnetic field.

In the automatic frequency control system of the present invention, the output signal of a microwave transmitter is sampled and coupled to a ferrite loaded cavity resonator of the type wherein the magnetic field supplied to the ferrite material in the cavity changes the effective permeability and hence the resonant frequency of the cavity. A unidirectional magnetic field biases the cavity to a desired reference frequency, and by further applying a sinusoidal magnetic field to the ferrite the resonant frequency varies about the established reference frequency and the output of the cavity as detected by a microwave detector diode provides an amplitude modulated control signal. If the transmitter signal coupled to the cavity is on either side of the established reference frequency, a sinusoidal output signal of the same frequency as the applied alternating magnetic field is produced. There is, however, a 180° phase shift in this signal when the transmitter frequency shifts from one side of the reference frequency of the cavity to the other. If the transmitter is on frequency with respect to the cavity reference, a double frequency signal is detected by the diode. By coupling the diode detector output through a tuned amplifier to a phase detector, it is possible to obtain a control voltage to tune the transmitter. The amplifier rejects the double frequency signal when the transmitter is on frequency and the phase detector provides a corrective signal when the transmitter shifts either above or below the established reference frequency.

Figures 1, 2:
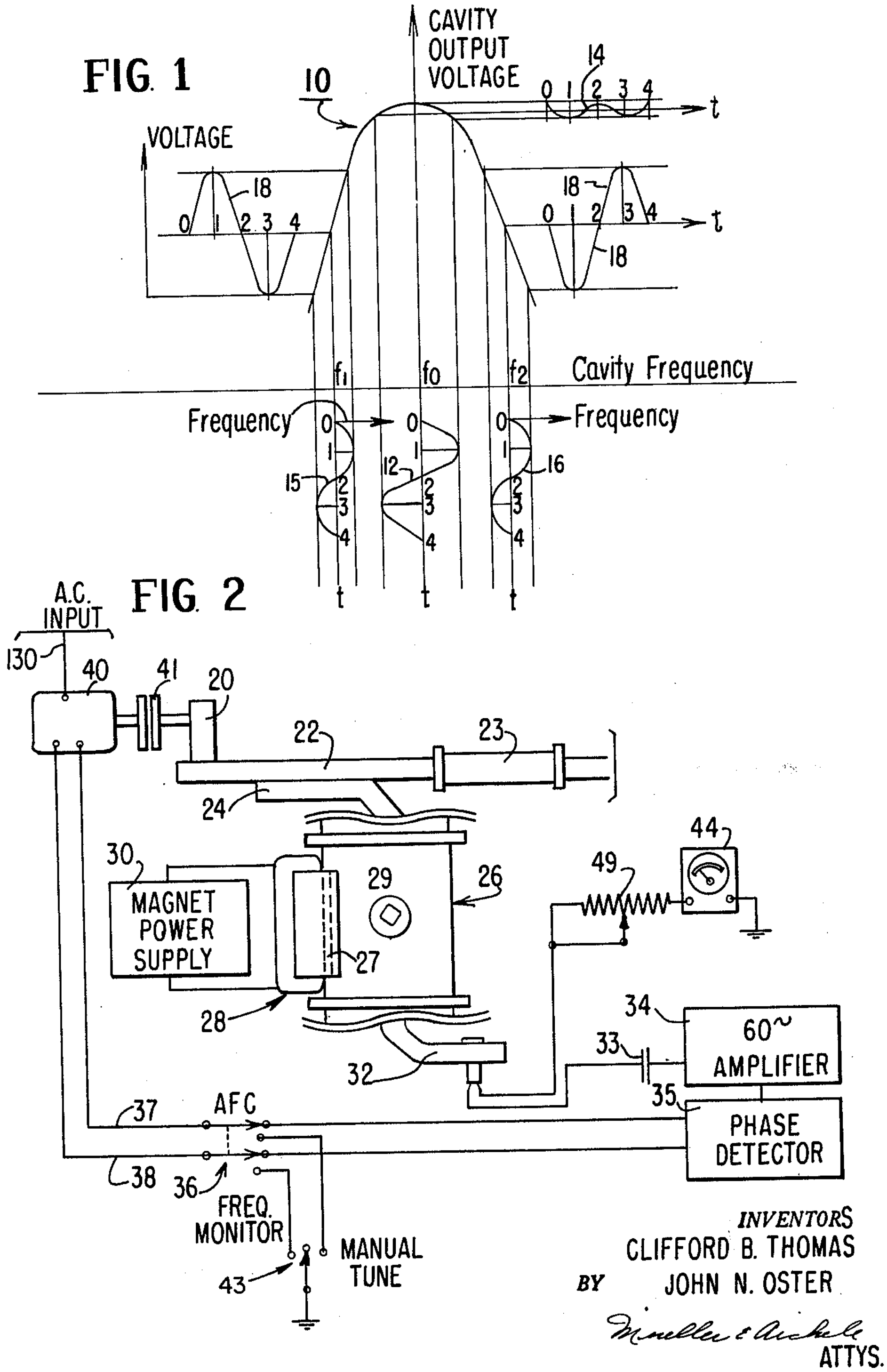
FIG. 1 is a set of curves showing the manner in which frequency variation of a reference cavity produces an amplitude modulated output voltage.
FIG. 2 is a diagram partially in schematic and partially in block form of the automatic frequency control system of the present invention.

FIG. 1 illustrates the manner in which the cavity produces an amplitude modulated signal when subjected to frequency deviation. Curve 10 shows the pass band characteristics of a typical resonant cavity, with the relative detected output voltage being represented by the vertical axis and the cavity frequency being represented by the horizontal axis. It is to be understood that the relationship between the cavity output and the frequency is relative and that the same results may be achieved either by frequency modulation of the signal applied to a fixed tuned cavity or by periodically varying the resonant frequency of the cavity about a fixed reference frequency. For simplicity of illustration, a single cavity resonant curve has been shown, although in practicing the present invention frequency deviation is accomplished by varying the cavity resonant frequency about an established reference. When the transmitter output is at frequency $f_0$, the reference frequency of the cavity, and frequency deviation is produced about $f_0$ in the manner shown by waveform 12, amplitude modulated output signal 14 is produced. It is to be noted that the frequency of output signal 14 is double that of the frequency of deviation of the cavity as represented by waveform 12. If however, the transmitter frequency coupled to the cavity is either above or below the resonant frequency of the cavity, as for example, frequencies $f_1$ or $f_2$ and frequency deviation is produced by the manner represented by waveforms 15 and 16, amplitude modulated output signals 17 and 18 are produced. Output signals 17 and 18 are of the same frequency as the frequency deviation of cavity but are 180° out of phase with respect to each other. A diode detector coupled to the cavity will provide amplitude modulated signals such as shown by waveforms 14, 17, or 18, respectively, depending on whether the center frequency of the transmitter is on, below, or above the reference frequency established by the cavity.

It is known that a piece of ferrite material disposed in a microwave cavity and having a unidirectional magnetic field applied thereto such that the direction of the magnetic field is perpendicular to the $\vec{H}$ vector of an electromagnetic field coupled to the cavity will shift the resonant frequency of the cavity in proportion to the magnitude of the applied magnetic field. Further, if the direction of the applied magnetic field is periodically reversed there will be a corresponding shifting of the resonant frequency of the cavity about a center reference frequency. For small excursions about the origin the frequency $f$ produced in the presence of an applied magnetic field may be represented by $$(1)\qquad f=f_0+ah^2$$

where $f_0$ is the resonant frequency with no applied field, $h$ is the magnitude of the applied field, and $a$ is a constant which depends on the ferrite material. A sinusoidal magnetic field may be represented by $$(2)\qquad h=h_0 \cos \text{wt.}$$

Substituting Equation 2 into Equation 1 and expanding, the frequency may be expressed by $$(3)\qquad f=f_0+\frac{ah^2_0}{2}+\frac{1}{2}ah_0 \cos 2 \text{ wt.}$$

It is apparent from Equation 3 that the frequency deviation of the cavity occurs at a double rate of the frequency applied field and that it occurs about a fixed frequency of $$f_0+\frac{ah^2_0}{2}$$

and not about $f_0$. Since the second term of Equation 3 is introduced by the applied alternating magnetic field, the cavity cannot be tuned without the applied alternating field being present without introducing considerable error. However, if the unidirectional magnetic field is applied in addition to the alternating magnetic field, the term introduced by the alternating magnetic field may be compensated for. Thus, if H represents the unidirectional magnetic field applied to the cavity, the total applied field may be represented by $$(4)\qquad h=H+h_0 \cos \text{wt.}$$

By substituting Equation 4 into Equation 1 and expanding, the frequency is expressed by $$(5)\qquad f=f_0+aH^2+\frac{ah^2_0}{2}+2ah_0H \cos \text{wt.}+\frac{ah^2_0}{2} \cos^2 \text{wt.}$$

If $h_0$ is made small and H large, the second order terms of $h_0$ become negligible and Equation 5 may be simplified:

$$(6)\qquad f=f_0+aH^2+2ah_0 H \cos \text{wt.}$$

From Equation 6 it may be seen that with an applied unidirectional field which is large in relation to the applied alternating field, no additional fixed term is introduced by the alternating field and the cavity can be properly tuned in the absence of the alternating magnetic field. In addition, the frequency deviation of the cavity is the same as the frequency of the applied alternating magnetic field.

An automatic frequency control system having a ferrite loaded cavity with magnetic fields applied as set forth above is illustrated in FIG. 2. A microwave transmitting tube such as a klystron 20 couples electromagnetic energy into one port of waveguide directional coupler 22. This energy is propagated through the main arm of directional coupler 22 to ferrite load isolator 23 and is then coupled by suitable waveguide to the remainder of the system. Side arm 24 of directional coupler 22 samples incident wave energy and supplies it to resonant cavity 26, which for purposes of illustration is enlarged in FIG. 2. It is to be understood, however, that the dimensions of cavity 26 are the same as the remaining waveguide in a practical system. Arm 24 further provides isolation in the order of 10 to 20 db from the main wave energy supplied to the system.

For conventional rectangular waveguide systems cavity 26 is a short section of waveguide adapted to sustain oscillations in the $TE_{101}$ mode. A thin slab of ferrite material 27 is applied against one of the narrow walls of the waveguide. A large number of materials exhibiting ferrimagnetic resonance phenomena are widely available in the microwave arts today. By way of example, one such material is commercially available as R–151 ferrite, and may be used in portions of the microwave spectrum known as C-band and X-band. Electromagnet 28 is attached externally to the wave guide cavity and has pole pieces capable of producing a magnetic field which is perpendicular to the $\vec{H}$ vector of oscillations of a given mode in the cavity. For a resonant cavity sustaining the $TE_{101}$ mode the H-field exists in the cavity in the form of closed loops which lie along the periphery of the narrow walls in a series of planes parallel to the wide walls of the cavity, with the maximum magnitude of the H-field occurring just at the narrow walls and diminishing to zero at the center of the cavity. Tuning screw 29, centered in the wide wall at the maximum point of the E-field, is further provided to be inserted into the cavity to vary its capacitance to allow tuning over a selected frequency band. Energization current for electromagnet 28 is provided by magnet power supply 30. As further discussed in conjunction with FIG. 5 supply 30 provides both a unidirectional current and an alternating 60 cycle current to the magnet coil so that both alternating and unidirectional magnetic fields may be simultaneously applied to ferrite material 27.

Detector mount 32, containing a microwave diode detector, is also connected to reference cavity 26. The output of this detector mount, which is an amplitude modulated sinusoidal signal as shown by waveforms 14, 17 and 18 in FIG. 1, is coupled by capacitor 33 to the input of tuned amplifier 34. Amplifier 34 is sharply tuned to 60 cycles so that it will only pass signals of the same frequency as provided by magnet power supply 30. The double frequency component represented by waveform 14, indicating that the transmitted signal is on frequency is rejected by the amplifier. The output of amplifier 34 is connected to phase detector 35. Double pole double throw switch 36 conects control windings 37 and 38 of reversible motor 40 to phase detector 35. With switch 36 in the "AFC" position shown, the system of FIG. 2 functions to provide automatic frequency control of transmitting tube 20. In its alternate "Freq. Monitor" position switch 36 connects control windings 37 and 38 to switch 43 to enable transmitting tube 20 to be manually tuned to the reference frequency provided by reference cavity 26, as hereinafter described. The shaft of motor 40 is coupled by a clutch arrangement 41 to the tuning element of microwave transmitting tube 20 so that rotation of the shaft of motor 40 mechanically tunes transmiting tube 20. Rotation of the tuner by motor 40 in response to the output of phase detector 35 causes a corresponding increase or decrease in output frequency of the tube.

In operation, the 120 cycle output of detector 32, provided in the manner shown by waveform 14 in FIG. 1 when the transmitter is on frequency, is prevented by tuned amplifier 34 from reaching phase detector 35. Accordingly, there is no voltage applied to control windings 37 and 38 and motor 40 remains at rest. When the output of transmitter tube 20 is below the frequency established by reference cavity 26, a 60 cycle signal component is coupled by amplifier 34 to phase detector 35. Phase detector 35 accordingly energizes control winding 37 to allow the shaft of motor 40 to rotate in a predetermined direction. This rotation tunes transmitting tube 20 in a direction to increase its output frequency until the desired frequency is reached. If, on the other hand, the output of transmitting tube 20 is above the frequency established by reference cavity 26, a 60 cycle signal component is coupled by amplifier 34 to phase detector 35 and applied to control windings 38. This reverses the direction of rotation of motor 40 and causes transmitting tube 20 to be tuned in a direction which decreases its output frequency until the desired frequency has been established.

It is to be understood that electronic tuning of transmitting tube 20 by a change in its reflector voltage in response to the output of phase detector 35 may also be achieved. However, to minimize non-linearity of the frequency deviation when a modulating signal is applied to the reflector of the klystron mechanical tuning is preferred. This allows for compensation of center frequency shifts produced by expansion and contraction of the klystron cavity resonator in the presence of ambient temperature changes without changing the reflector voltage operating point, and the resulting cross-talk in multichannel communications systems arising from distortion in the frequency modulated output is kept at a minimum. Although described as a klystron with mechanical tuning of its cavity resonator, it should be apparent to those skilled in the art that transmitting tube 20 may conveniently be any one of a number of known linear beam or cross-beam microwave oscillating tubes, and the frequency correcting action in response to the output of phase detector 35 may be in the nature of a torque, an angular displacement, a current, a voltage, or a magnetic field, depending on the type of microwave oscillator used.

Figure 3:
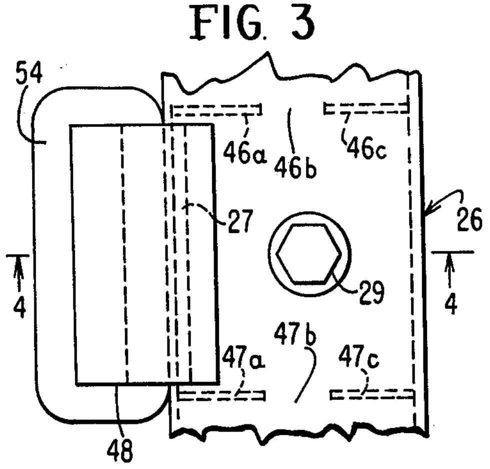
FIG. 3 shows the structural detail of the reference cavity used in the system of FIG. 2.
Figure 4:
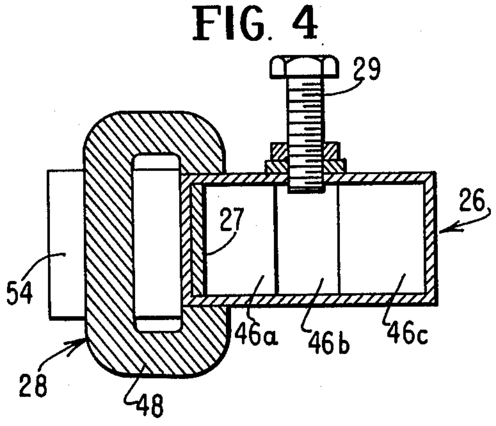
FIG. 4 is a cross-section of the cavity of FIG. 3 taken along lines 4—4.

A structural embodiment of resonant cavity 26 is shown in detail in FIGS. 3 and 4. A thin slab of ferrite material 27 is secured to the narrow wall of a section of waveguide forming cavity 26 in the region of maximum H-field. Metallic plates 46*a* and 46*c* form an aperture 46*b* to provide an inductive susceptance to one end of the waveguide section while metallic plates 47*a* and 47*c* form aperture 47*b* to provide an identical susceptance slightly less than one-half a wavelength away in the waveguide section. These two inductive obstacles form a cavity resonator in the waveguide section, with the width of apertures 46*b* and 47*b* determining the Q of the cavity. Tuning screw 29 extends through the center of the wide wall of the cavity in the region of maximum E-field to provide coarse tuning of the cavity, with fine tuning and frequency deviation provided by application of a biasing and an alternating magnetic field to ferrite slab 27 by electromagnet 28. Core 48 of electromagnet 28 has pole pieces terminating on the wide walls of the waveguide section to direct the magnetic field in a sense perpendicular to the H-field existing in resonator 26 and the magnetic fields are produced by simultaneously feeding A.C. and D.C. currents through coil 54.

To insure maximum frequency stability of the cavity for use as an effective frequency reference in the absence of a controlled ambient temperature the waveguide section in which the cavity is formed is fabricated from a non-magnetic metal having a low temperature coefficient of expansion. Type 302 stainless steel, supplied by Carpenter Steel Co., has been found suitable for this purpose, although other metals with these properties may also be utilized. In that humidity changes alter the dielectric constant of the air in the cavity to affect its resonant frequency, it is desirable to seal the ends of the waveguide section with Mylar windows. This also prevents moisture absorption of the ferrite, which alters its effective permeability to further cause changes in the resonant frequency.

Figure 5:
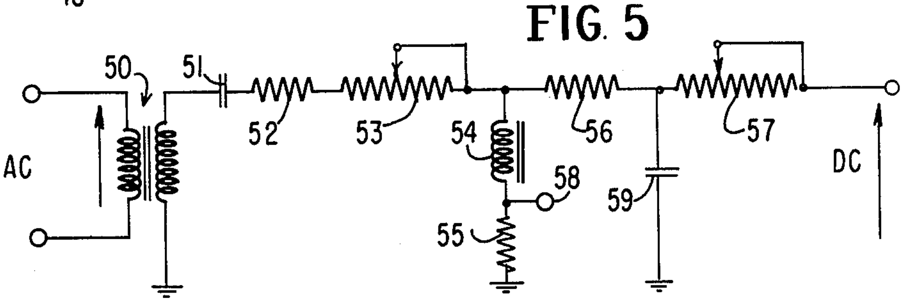
FIG. 5 is a schematic diagram of a circuit for applying the magnetic fields to the ferrite loaded cavity in the system of FIG. 2.

A circuit for shunt feeding both direct current and alternating current to electromagnet 28 is shown in FIG. 5. The 60 cycle alternating current is supplied by transformer 50 between one side of capacitor 51 and ground reference potential. Resistors 52 and 53 connect the other side of capacitor 51 to a common input terminal on magnet coil 54. The other side of coil 54 is connected through test resistor 55 to ground reference potential. A direct current voltage is also connected to the common input terminal of magnet coil 54 through resistors 56 and 57. Thus, the coil 54 for electromagnet 28 forms a leg of a T network which supplies both alternating current and direct current to the coil. Variable resistors 53 and 57 provide independent adjustment of the alternating and the direct currents applied to coil 54 while a filter network including capacitor 59 and resistors 56 and 57 serves to isolate the direct current supply from the alternating current source. A test point 58 across calibrated resistor 55 is used to determine the magnitude of the energization currents supplied to coil 54 so that the conditions set forth in Equation 6 above may be established.

As previously mentioned, the reference frequency of cavity 26 is determined by adjustment of tuning screw 29 and by the magnitude of the unidirectional magnetic field applied to ferrite material 27. When coarse tuning has been accomplished by tuning screw 29, the reference frequency established by cavity 26 is set by the amount of direct current through magnet coil 54. By biasing the cavity to a linear point on its magnetic field strength versus frequency curve for the particular ferrite used, a superimposed alternating magnetic field provides a harmonic free frequency deviation of the cavity, with a frequency variation that occurs at the same rate as the applied alternating magnetic field. Further, when the applied alternating magnetic field is made small with respect to the unidirectional biasing field, no fixed frequency shift is introduced. It is therefore possible, in the absence of frequency deviation, to utilize cavity 26 as a frequency monitor for permitting transmitting tube 20 to be manually tuned to the reference frequency established by the magnetically biased cavity.

To this end switch 36 is moved to its alternate or "Freq. Monitor" position. In this position control windings 37 and 38 of motor 40 are connected to the fixed contacts of switch 43. The movable contact of switch 43, spring loaded to provide a center "off" position, is connected to ground. By manually moving switch 43 to connect either control winding 31 or 38 to ground, it is possible to tune transmitting tube 20 to the reference frequency provided by cavity resonator 26. A maximum reading on a monitoring device such as D.C. microammeter 44 (FIG. 2), connected to the output of detector 32, indicates that the transmitted frequency is the same as that of high Q reference cavity 26. Variable resistor 49 is used to limit the current through meter 44 so that a two-thirds scale deflection is not exceeded when the transmitter is on frequency.

Figure 6:
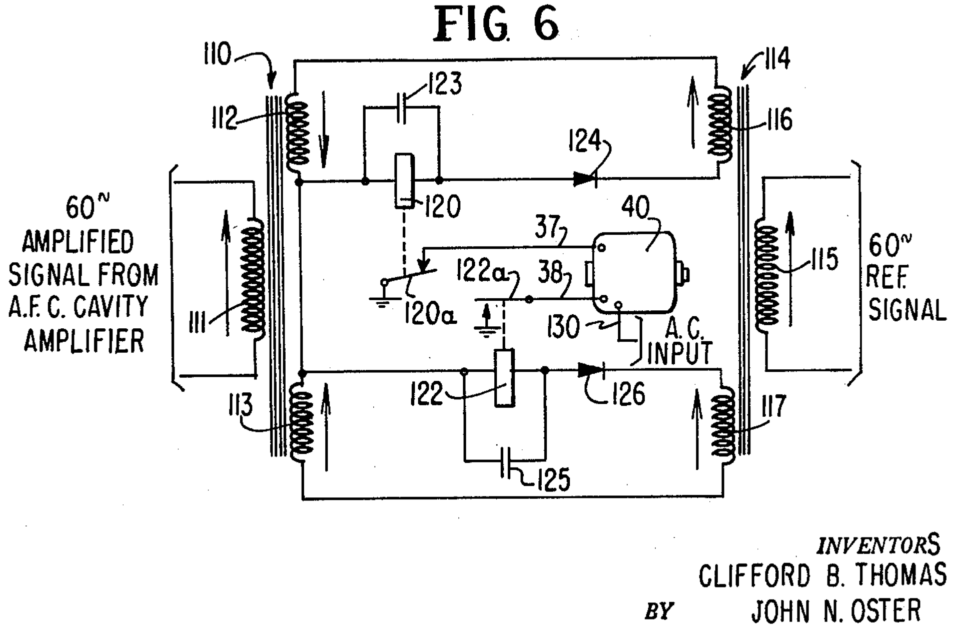
FIG. 6 is a schematic diagram of a phase detector for supplying a control voltage to the microwave transmitter of FIG. 2.

A suitable phase detector circuit for applying a control voltage to motor windings 37 and 38 is shown in FIG. 6. The 60 cycle output signal of amplifier 34 is connected across primary winding 111 of transformer 110. Secondary windings 112 and 113 of transformer 110 are wound in opposite phase relationship to each other. A 60 cycle reference frequency signal is connected across primary 115 of transformer 114. Secondary windings 116 and 117 of transformer 114 are wound to have the same phase relationship with each other. One side of each of secondary windings 112 and 116 are connected together, as is one side of each of secondary windings 113 and 117. The other side of secondary windings 112 and 116 are connected to opposite sides of relay solenoid 120. Capacitor 123 shunts solenoid 120 and diode 124 is connected in series with solenoid 120 to allow current to pass only in one direction. In a similar manner, solenoid 122 is connected between the other side of windings 113 and 117 and bypass by capacitor 125. Diode 126 further allows current flow through solenoid 122 in one direction only.

When the 60 cycle output from amplifier 34 appearing across winding 111 is in phase with the reference signal appearing across winding 115, the currents induced in windings 112 and 116 add to energize relay solenoid coil 120. Relay contact 120*a* grounds motor control winding 37 to complete the circuit path for the input voltage of motor 40 supplied on lead 130. This causes motor 40 to rotate in a predetermined direction. At the same time, the currents induced in windings 113 and 117 subtract and the solenoid for relay 122 is not energized. When the output of amplifier 34 is out of phase with respect to the reference signal supplied to winding 115, the currents induced in windings 112 and 113 are reversed. In this instance solenoid 120 is de-energized and solenoid 122 becomes energized. Accordingly, relay contact 122*a* connects control winding 38 to ground and the direction of rotation of motor 40 is reversed. The phase detection circuit of FIG. 6 therefore provides a simple and reliable circuit for reversing the rotation of motor 40 whenever the detected output of cavity 26 reverses in phase to indicate that the transmitted frequency of the system has shifted either above or below a reference frequency. The motor operates to retune microwave transmitter 20 until the system output signal is back on frequency.

The invention provides therefore a simple automatic frequency control system for stabilizing the frequency of a microwave transmitter. Use of a ferrite loaded cavity and of a single detector diode allows a control signal to be provided independently of diode ageing characteristics. Frequency deviation is achieved by applying an alternating magnetic field to the ferrite material in the cavity so that the transmitter need not be frequency modulated for control signal purposes. In addition, a unidirectional magnetic field applied to the ferrite material establishes a reference frequency that is independent of the alternating magnetic field to provide a detected amplitude modulated output signal that is linear and which provides a frequency that corresponds to the frequency of the applied alternating field. Since the reference frequency is not shifted by the application of an alternating magnetic field for deviation purposes, it is possible to further utilize the cavity as a frequency monitor for tuning the transmitter in the absence of the applied alternating field.

We claim:

1. In a wave generating system having means for producing high frequency electromagnetic oscillations, an automatic frequency control system including in combination, a cavity resonator containing a ferrite material for sustaining oscillations, means for coupling a portion of the generated wave to said resonator, means for applying a magnetic field to the ferrite material in said resonator, said magnetic field having a unidirectional component for establishing the resonant frequency of said resonator and an alternating component for producing frequency deviation about said resonant frequency, said unidirectional component being applied independently of said alternating component and being large with respect to said alternating component such that said resonator is tunable by said unidirectional component in the absence of said alternating component, detector means coupled to said resonator to provide a signal having amplitude modulations indicative of the frequency deviations produced by said alternating magnetic field component, and means responsive to said detected signal to control the frequency of oscillations produced by said wave generating system, whereby said resonator may be pretuned in the absence of the alternating component of said magnetic field, thereby to function as an automatic frequency control reference and a frequency monitor in said system.

2. In a wave generating system having means for producing high frequency electromagnetic oscillations, an automatic frequency control system including in combination, a cavity resonator containing a ferrite material for sustaining oscillations, means for coupling a portion of the generated wave to said resonator, means for applying a magnetic field to the ferrite material in said resonator, said magnetic field having a unidirectional component for establishing the resonant frequency of said resonator and an alternating component for providing frequency deviation about said resonant frequency, said unidirectional component being applied independently of said alternating component and being large with respect to said alternating component such that said resonator is tunable by said unidirectional component in the absence of said alternating component, detector means coupled to said resonator to provide a signal having amplitude modulations indicative of the frequency deviations produced by said alternating magnetic field component, with said amplitude modulated signal having the same frequency as said alternating magnetic field component for electromagnetic oscillations differing in frequency from the resonant frequency of said resonator, and means responsive to said detected signal to change the frequency of said generated wave, whereby said resonator may be pretuned in the absence of the alternating component of said magnetic field thereby to function as an automatic frequency control reference and a frequency monitor in said system.

3. An auomatic frequency control system for a microwave transmitter having mechanically tunable means for generating electromagnetic waves at a pretuned frequency, said automatic frequency control system including in combination, a cavity resonator containing a ferrite material for sustaining oscillations, means for coupling a portion of said generated wave to said resonator, means for applying a magnetic field to said ferrite material, said magnetic field having a unidirectional component for establishing the resonant frequency of said resonator and an alternating component for producing frequency deviation about said resonant frequency, said unidirectional component being applied independently of said alternating component and being large with respect to said alternating component such that said resonator is tunable by said unidirectional component in the absence of said alternating component, detector means coupled to said resonator to provide a signal having amplitude modulations indicative of the frequency deviations produced by said alternating magnetic field component, with said amplitude modulated signal having a first phase for frequencies of the wave coupled to said resonator higher than the resonant frequency established by the unidirectional magnetic field component and a second phase for frequencies of the wave coupled to said resonator lower than the resonant frequency established by said unidirectional magnetic field component, a reversible motor for mechanically tuning said wave generating means, and phase sensitive means responsice to said amplitude modulated signal to operate said motor to retune said wave generating means so that the frequency of said generated wave is automatically tuned to the resonant frequency of said cavity, whereby said resonator may be pretuned in the absence of the alternating component of said magnetic field thereby to function as an automatic frequency control reference and a frequency monitor in said system.

4. In an automatic frequency control system for automatically mechanically adjusting the tuning of a high frequency wave generating device to thereby stabilize the frequency of the generated wave, a sensing circuit for producing a low frequency amplitude modulated signal indicative of frequency shifts of said generated wave, said sensing circuit including in combination, a tunable ferrite loaded cavity resonator for sustaining electromagnetic oscillations, means for applying a magnetic field to the ferrite material in said resonator in a sense perpendicular to the magnetic field component of said sustained electromagnetic oscillations with said applied magnetic field having a unidirectional component to establish a resonant frequency for said resonator and an alternating component for providing frequency deviation about said resonant frequency, said unidirectional component being applied independently of said alternating component and being large with respect to said alternating component such that said resonator is tunable by said unidirectional component in the absence of said alternating component, and detector means coupled to said resonator to provide an amplitude modulated signal in response to said frequency deviation, with the phase of said amplitude modulated signal indicative of the direction of the frequency shift of said generated wave with respect to the resonant frequency of said resonator, whereby said resonator may be pretuned in the absence of the alternating component of said magnetic field thereby to function as an automatic frequency control reference and a frequency monitor in said system.

5. An automatic frequency control system for automatically mechanically adjusting the tuning of a high frequency wave generating device to thereby stabilize the frequency of the generated wave, including in combination, a tunable ferrite loaded cavity resonator for sustaining electromagnetic oscillations, means for coupling a portion of said generated wave to said resonator, means for applying a magnetic field to the ferrite material in said resonator in a sense perpendicular to the $\vec{H}$ component of the electromagnetic oscillations sustained by said resonator, with said applied magnetic field having a unidirectional component to establish a resonant frequency for said resonator and an alternating component to produce frequency deviation about said resonant frequency, said unidirectional component being applied independently of said alternating component and being large with respect to said alternating component such that said resonator is tunable by said unidirectional component in the absence of said alternating component, detector means coupled to said resonator to provide an amplitude modulated signal in response to said frequency deviation, with the phase of said amplitude modulated signal indicative of the direction of frequency shift of said generated wave with respect to said resonant frequency of said resonator, phase sensitive means coupled to said detector, and means responsive to said phase sensitive means to provide mechanical tuning of said wave generating device in response to the phase of said amplitude modulated signal, such that said wave generating device is automatically retuned to compensate for frequency changes, whereby said resonator may be pretuned in the absence of the alternating component of said magnetic field thereby to function as an automatic frequency control reference and a frequency monitor in said system.

References Cited in the file of this patent

UNITED STATES PATENTS

| | | |
|---|---|---|
| 2,788,445 | Murray et al. | Apr. 9, 1957 |
| 2,853,612 | Newman | Sept. 23, 1958 |
| 2,965,863 | Fay | Dec. 20, 1960 |

OTHER REFERENCES

Rideout: Pro. I.R.E., vol. 35, No. 8, August 1947, pp. 767–771.

Grant: Pro. I.R.E.—Waves and Electrons Section, August 1949, pp. 943–951.